(12) United States Patent  (10) Patent No.: US 8,322,035 B2
Yan  (45) Date of Patent: Dec. 4, 2012

(54) VERTICAL AXIS WIND TURBINE AND METHOD OF INSTALLING BLADES THEREIN

(76) Inventor: Qiang Yan, Shanghai (CN)

( * ) Notice: Subject to any disclaimer, the term of this patent is extended or adjusted under 35 U.S.C. 154(b) by 409 days.

(21) Appl. No.: 12/342,067

(22) Filed: Dec. 22, 2008

(65) Prior Publication Data

US 2009/0100676 A1  Apr. 23, 2009

Related U.S. Application Data

(63) Continuation-in-part of application No. PCT/CN2007/001983, filed on Jun. 25, 2007, and a continuation-in-part of application No. 12/234,784, filed on Sep. 22, 2008, now Pat. No. 7,967,569, which is a continuation-in-part of application No. PCT/CN2007/000958, filed on Mar. 26, 2007.

(30) Foreign Application Priority Data

Mar. 29, 2006 (CN) .......................... 2006 1 0025202
Jun. 28, 2006 (CN) .......................... 2006 1 0028267

(51) Int. Cl.
  *B21K 25/00* (2006.01)
(52) U.S. Cl. .................. 29/889.21; 415/907; 416/210 R
(58) Field of Classification Search ............ 29/889, 29/889.2, 889.21, 889.7; 415/4.2, 4.4, 83, 415/86, 87, 907; 416/210 R, 211, 200 R, 416/200 A, 223 R, 237
See application file for complete search history.

(56) References Cited

U.S. PATENT DOCUMENTS

| 1,835,018 | A |   | 12/1931 | Darrieus |
|---|---|---|---|---|
| 4,065,225 | A | * | 12/1977 | Allison .......................... 416/121 |
| 4,115,027 | A | * | 9/1978 | Thomas ....................... 415/53.1 |
| 4,130,380 | A | * | 12/1978 | Kaiser ........................ 416/197 A |
| 4,255,085 | A | * | 3/1981 | Evans ........................ 416/197 A |
| 4,264,279 | A |   | 4/1981 | Dereng |
| 4,362,469 | A | * | 12/1982 | van Holten ................... 416/191 |
| 4,415,312 | A | * | 11/1983 | Brenneman .................. 416/119 |
| 4,530,644 | A | * | 7/1985 | Van Holten ................... 416/175 |
| 4,979,871 | A | * | 12/1990 | Reiner .......................... 415/4.2 |
| 6,688,842 | B2 | * | 2/2004 | Boatner ......................... 415/4.2 |
| 6,974,309 | B2 | * | 12/2005 | Seki .......................... 416/227 R |

(Continued)

FOREIGN PATENT DOCUMENTS

CN  1213042 A  4/1999
(Continued)

OTHER PUBLICATIONS

Machine Translation of Wang; CN 1719023 A; Jul. 2005.*

*Primary Examiner* — David Bryant
*Assistant Examiner* — Ryan J Walters
(74) *Attorney, Agent, or Firm* — Manni Li; Mei & Mark LLP (57) ABSTRACT

A vertical axis wind turbine comprising: a plurality of support arms (2) connected with a vertical axis (1), a wind rotor comprising a plurality of blades (3) connected to the blade support arms (2), the wind rotor having a rotation radius and the blades (3) having a chord length; wherein an airfoil of the blade is an asymmetrical camber airfoil, the convex surface (31) of the blade (3) faces vertical axis (1), and a ratio of the rotation radius of the wind rotor (R) to the chord length of the blade (L) is between about 1.8 and about 4.

7 Claims, 6 Drawing Sheets

U.S. PATENT DOCUMENTS

| | | | |
|---|---|---|---|
| 7,360,995 B2 * | 4/2008 | Suzuki | 416/211 |
| 7,390,163 B2 | 6/2008 | Clauson | |
| 2007/0071604 A1 * | 3/2007 | Suzuki | 416/197 A |
| 2009/0016892 A1 * | 1/2009 | Yan | 416/223 R |

FOREIGN PATENT DOCUMENTS

| | | | |
|---|---|---|---|
| CN | 2462104 Y | | 11/2001 |
| CN | 1109818 C | | 5/2003 |
| CN | 1484734 A | | 3/2004 |
| CN | 1719023 A | * | 1/2006 |
| JP | 2005-171852 A | | 6/2005 |
| JP | 2005-307850 A | | 11/2005 |
| JP | 2006-17011 A | | 1/2006 |
| WO | 2005/038251 A1 | | 4/2005 |

* cited by examiner

RELATED ART

VERTICAL AXIS WIND TURBINE AND METHOD OF INSTALLING BLADES THEREIN

CROSS-REFERENCE TO RELATED APPLICATIONS

This application is a continuation-in-part of International Patent Application No. PCT/CN2007/001983 with an international filing date of Jun. 25, 2007, designating the United States, now pending, is a continuation-in-part of U.S. application Ser. No. 12/234,784 filed on Sep. 22, 2008, which is a continuation-in-part of International Patent Application No. PCT/CN2007/000958 with an international filing date of Mar. 26, 2007, designating the United States, now pending. This application claims priority benefits of Chinese Patent Application No. 200610028267.7 filed Jun. 28, 2006 and of Chinese Patent Application No. 200610025202.7 filed Mar. 29, 2006. The contents of all of the aforementioned specifications, including any intervening amendments thereto, are incorporated herein by reference.

BACKGROUND OF THE INVENTION

1. Field of the Invention

This invention relates to a vertical axis wind turbine, and particularly to an arrangement and installation method of blades that can effectively improve the efficiency of a vertical axis wind turbine.

2. Description of the Related Art

To make better use of wind energy, wind power generation devices have been developed. These can be divided according to the different position of the rotary axis of the wind turbine into horizontal axis wind turbines (HAWTs) and vertical axis wind turbines (VAWTs).

VATW rotors can be also divided into two types: lift-type rotors and drag-type rotors. Characteristics of lift-type rotors and drag-type rotors are described, e.g., in Wind energy and its utilization, Beijing: China Energy Press, 1984. Although both lift-type and drag-type rotors are vertical axis rotors, the principles behind their working are completely different.

In lift-type rotors, when wind blows over the surface of a blade, wind speeds at the blade's outer and inner surfaces are different due to different profile of the surfaces. The difference in wind speeds creates pressure difference between the surfaces and hence a lift force. Because the blades are installed in such a way that the angle of attack varies from blade to blade, a driving moment is created around rotor's centre of gyration, driving the rotor to rotate. However, when the wind rotor rotates, a specific resistance is produced by the blades due to their wing shape. The higher the rotating speed, the bigger the resistance, until a balance is achieved between the lift force and resistance. Therefore, the efficiency of the lift-type wind rotor depends on its design parameters, including the wing shape and the angle of installation of the blades.

Drag-type rotors differ from lift-type rotors in that the shape of the blades is different and in that in drag-type rotors the drag coefficients are different on both sides of the blades. The side with a bigger drag coefficient obtains a bigger wind pressure. Because drag-type rotors use the component of wind's force that is vertical to wing surface, "positive work" is done in rotor's right half circumference, while "negative work" is done in the rotor's left half circumference. Because the wind speeds at left and right sides are the same and the difference only lies in the drag coefficients on both sides of the blade, the work done in the left and the right half circumferences is a function of the blade's drag coefficient multiplied by the cube of the blade's relative wind speed.

If the wind speed is denoted by V and the linear speed of the rotor rotation is denoted by u, then because the wind "drives" blade to move in the right half circumference, the blade's relative linear speed is V−u, and because the blade moves upwind in the left half circumference, the blade's relative linear speed is V+u. Therefore, when the wind blows from the left, the left gate flap has the biggest moment and the moments at other positions are smaller. Once the blades are selected, the drag coefficients on both sides of blades are fixed. Therefore, the difference between work done in the rotor's left and right half circumferences decreases with the increase of rotor's rotational speed, i.e., the efficiency of the drag-type rotor decreases with the increase of the rotor's rotational speed. This is opposite to the efficiency profile of lift-type rotors.

The wind rotor of lift-type vertical axis wind turbine adopts wing-shaped straight blades. The axis line of the blade is parallel to that of the center of gyration. Normally, the blade is fixed on a blade support rotating around the center of gyration. When a strong enough wind blows over straight blades that are wing-shaped and form a specific angle with the tangent of rotating axis, lift force and resistance are produced. When the lift force is higher than the resistance, a moment of rotation around vertical axis is produced on these blades. However, the size and direction of the lift force and resistance changes continuously due to the constant changes in the rotating angle of blades with respect to the wind direction during rotation. That is to say that the size and direction of a moment produced at different positions of blades constantly changes. At some positions, a positive moment is produced, at other positions, a negative moment is produced. Thus, the wind energy utilization ratio of vertical axis wind turbine is decreased.

In aerodynamics, the rotating angle between chord line of the blade and the tangent of a position in the circumference is called the blade rotating angle $\alpha$. The azimuth angle of a wing-shaped blade at any relative position in the circumference is defined as $\beta$. The connecting line between blade's front and rear edges is called the chord line L, and the radius of the wind rotor's rotating around vertical axis is called rotation the radius of the wind rotor R. The ratio of the rotation radius of the wind rotor to the chord line of the blade is the radius/chord ratio. The radius/chord ratio is a very important parameter in the installation of the blades and a wind rotor of vertical axis wind turbine.

In existing designs of lift-type vertical axis wind turbines, there has been no emphasis on optimization of the radius/chord ratio. Conventionally, the size of the blade was set to be very narrow, i.e., the radius/chord ratio is set to be very large. This resulted in a starting difficulty but allowed the wind rotor to attain a high rotating speed. That is to say that the torque produced by the wind rotor was very small. Alternatively, the radius/chord ratio was set to be very small, which allowed for an easy rotor starting but resulted in a large resistance produced on the blade during the rotation of the wind rotor at a very high wind speeds; thus, the wind rotor was unable to reach higher rotating speeds.

The power of the rotor equals torque multiplied by the angular speed. Therefore, the conventional designs could neither make the motor obtain a large enough torque nor rotate at a sufficiently high speed. This affects the wind energy utilization ratio of vertical axis wind turbine and lowers the commercial value of conventional vertical axis wind turbines.

Besides, in conventional designs, blades are usually directly connected to the support arm by welding or by bolts and nuts. But, in an actual wind field, the force impact on the wind rotor consisting of blades is very complicated and in particular, a very strong centrifugal force is produced during high-speed rotation. Thus, the safety of blades connected to the support arm using the above methods cannot be ensured and blade fracture or detachment from the support arm may occur. In addition, existing vertical axes are all coaxially connected with the motor. But the wind rotor encounters a very large force impact in an actual wind field, which inevitably produces a horizontal vibration on the vertical axis, and thus adversely effects the operation of the rotor.

SUMMARY OF THE INVENTION

In view of the above-described problems, it is one objective of the invention to provide a vertical axis wind turbine having an optimum radius/chord ratio, and a method of blade installation in vertical axis wind turbine having an optimum radius/chord ratio, and making further improvement in the connecting structure of the blade and the support arm.

To achieve the above objectives, in accordance with one embodiment of the invention, provided is a vertical axis wind turbine and a method of installation thereof, the turbine comprising: a plurality of blades installed at blade support arms, wherein the aerofoil of the blade is a dissymmetrical aerofoil with camber; the blade is mounted in the manner that its convex surface faces the vertical axis; and the ratio of rotation radius of the wind rotor to chord length of the blade is between 1.8 and 4.

In certain classes of this embodiment, the range of the ratio of rotation radius of the wind rotor to chord length of the blade is between 1.8 and 3.

In certain classes of this embodiment, the range of the ratio of rotation radius of the wind rotor to chord length of the blade is between 2 and 3.

In certain classes of this embodiment, the range of blade rotating angle is between 0 and 10 degrees.

In certain classes of this embodiment, the range of blade rotating angle is between 2 and 8 degrees.

In certain classes of this embodiment, the number of blades comprising the wind rotor is 3-6.

In certain classes of this embodiment, the number of blades comprising the wind rotor is 5.

In certain classes of this embodiment, a metal ring having a proper width and thickness is disposed at one end of the support arm connected to blades, and blades are fixed inside this metal ring.

In other aspects of the invention, in order to overcome the negative effects on the motor due to horizontal vibrations resulting from coaxial connection of vertical axis and motor, the motor in this invention adopts a hollow rotating shaft so that the rotating axis of wind rotor passes through the motor's hollow shaft and is connected with the base, thus avoiding the loading weight of the wind rotor to the rotating axis of the motor. Adopting a direct connection of the vertical axis to the base rather than a coaxial connection to the motor avoids vibrations of the motor.

BRIEF DESCRIPTION OF THE DRAWINGS

The invention will now be described solely by way of example and with reference to the accompanying drawings, in which.

DETAILED DESCRIPTION OF THE INVENTION

The following examples are presented for the purpose of better understanding of this invention, rather than limitation of this invention.

Utilizing computational fluid dynamics (CFD) and contrast wind tunnel tests, we found that vertical axis wind turbine can have increased commercial development value supported by a comparatively high wind energy/mechanical energy conversion efficiency for the wind rotor under the following overall critical conditions: (a) the camber airfoil is mounted in a manner that its convex surface faces the vertical axis, (b) the angle of installation for the blade is 0-10 degrees, and (c) the ratio of the rotation radius of the wind rotor to the chord length of the blade (i.e. radius/chord ratio) is the range of between 1.8 and 4.

EXAMPLE 1

Figure 1:
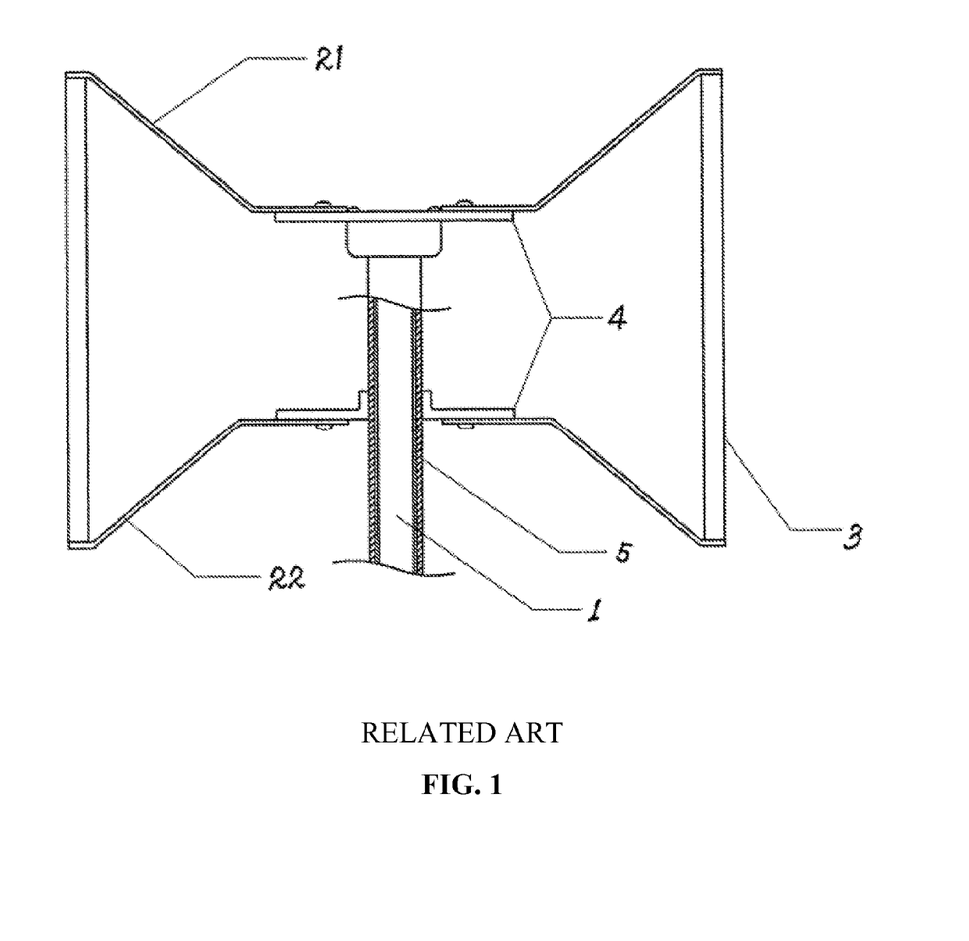
FIG. 1 is a schematic diagram of a blade according to one embodiment of the invention.
Figure 2:
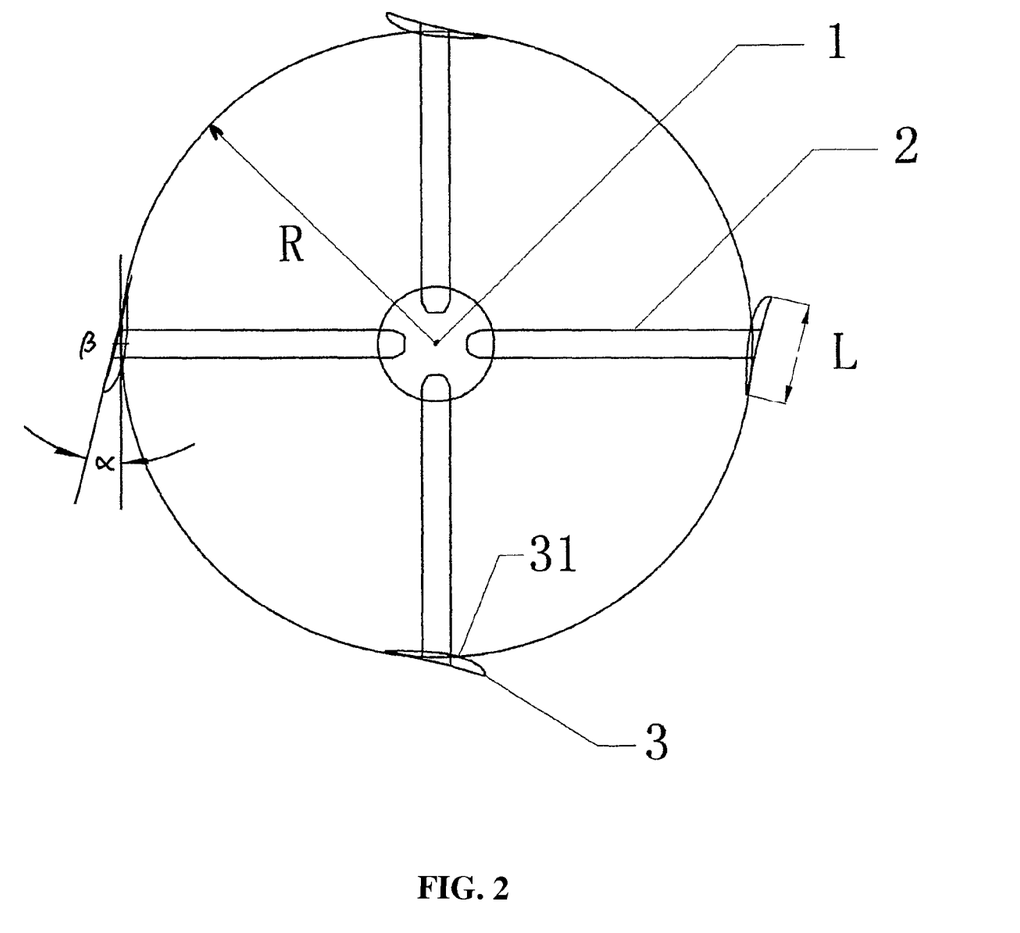
FIG. 2 is a schematic diagram of the vertical axis wind turbine according to one embodiment of the invention.

Determination of Rotating Speed and Power by CFW under Different Radius/Chord Ratios With reference to FIGS. 1 and 2, the vertical axis wind turbine of this invention comprises vertical axis 1, support arms 21 and 22 connected to the vertical axis 1, a wind rotor consisting of a plurality of blades mounted to support arm 2, blades 3 connected to axis sleeve 5 through support arms 21 and 22, and a flange 4. An aerofoil of the blade 3 is a dissymmetrical aerofoil with camber. The blade is mounted such that its convex surface 31 faces vertical axis 1.

The radius of the wind rotor was 0.68 m. The cumberairfoil blade Goe63 was mounted in such a way that its convex surface faces vertical axis. The blade rotating angle was between 0 and 10 degrees. The number of blades was 5. The wind speed was 10 m/s. The rotating speeds and output power of the wind rotor was by CFW under different radius/chord ratios.

Figure 3:
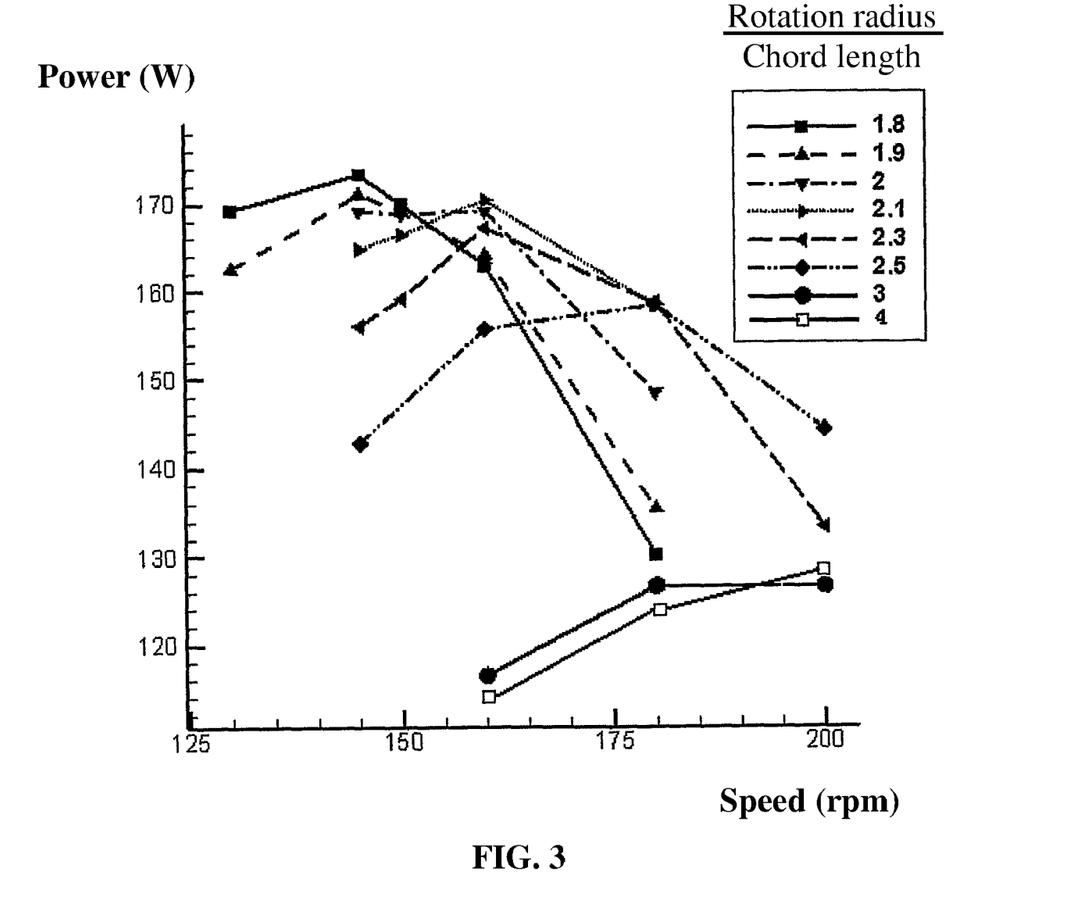
FIG. 3 is a graph of power (in W) versus speed (in rpm) for different values of the ratio of the rotation radius to the chord length according to the invention (Example 1)

With reference to FIG. 3, when the radius/chord ratio of a wind rotor and blades of vertical axis wind turbine was between 1.8 and 4, a relatively large output power was obtained. When the radius/chord ratio was 2-3, a relatively large output power for the wind rotor was obtained within a wide range of rotating speed. When the radius/chord ratio was less than 2, the available range of rotating speeds was narrow, but a large output power could also be obtained.

For a specific airfoil, fixing the angle of installation for the blade means fixing the resultant force and resistance of the blade, i.e., the resultant force equals the difference between torque force and resistance, which allows the wind rotor to obtain a driving moment.

Under the condition of a low rotating speed and a long chord of the blade, i.e., a small radius/chord ratio, the absolute value of the torque force increases faster than that of the resistance because the torque force for the blade is larger than the resistance. For example, under the condition of a torque coefficient of 0.3 and a resistance coefficient of 0.1, when the chord length of the blade increases one time, the absolute value of the torque force increases more than that of the resistance, which results in the increase of the resultant force as well as the moment of the wind rotor.

Under the condition of a high rotating speed and a long chord of the blade, i.e., a small radius/chord ratio, the vortex produced by the blade with a longer chord is larger than that produced by the blade with a shorter chord. Therefore, the absolute value of the resistance increases faster than that of the torque force, the resultant force imposed on the blades decreases and the moment of the wind rotor decreases accordingly, which finally gets the wind rotor into a race rotation (no load) and the rotating speed decreases.

Under the condition of a short chord of the blade, i.e., a large radius/chord ratio, when rotating at a low speed, although the resistance produced by a blade is smaller than that produced by the blade with a longer chord, the torque force is much smaller than that produced by the blade with a longer chord, as a result, the resultant force decreases, and the wind rotor gets a much smaller moment; when rotating at a high speed, the vortex produced by the blade with a short chord is much smaller than that produced by the blade with a longer chord, as a result, the resultant force as well as the resistance is small, which allows the wind rotor get a high rotating speed during no load.

EXAMPLE 2

Rotating Speed and Power by Computer Simulative Calculation under Different Blade Rotating Angles.

The radius of the wind rotor was 0.68 m. The cumber-airfoil blade Goe63 was mounted such that its convex surface faced the vertical axis. The number of blades was 5. The wind speed was 10 m/s. Then the rotating speeds and output power of the wind rotor were calculated by CFW under different blade rotating angles.

Figure 4:
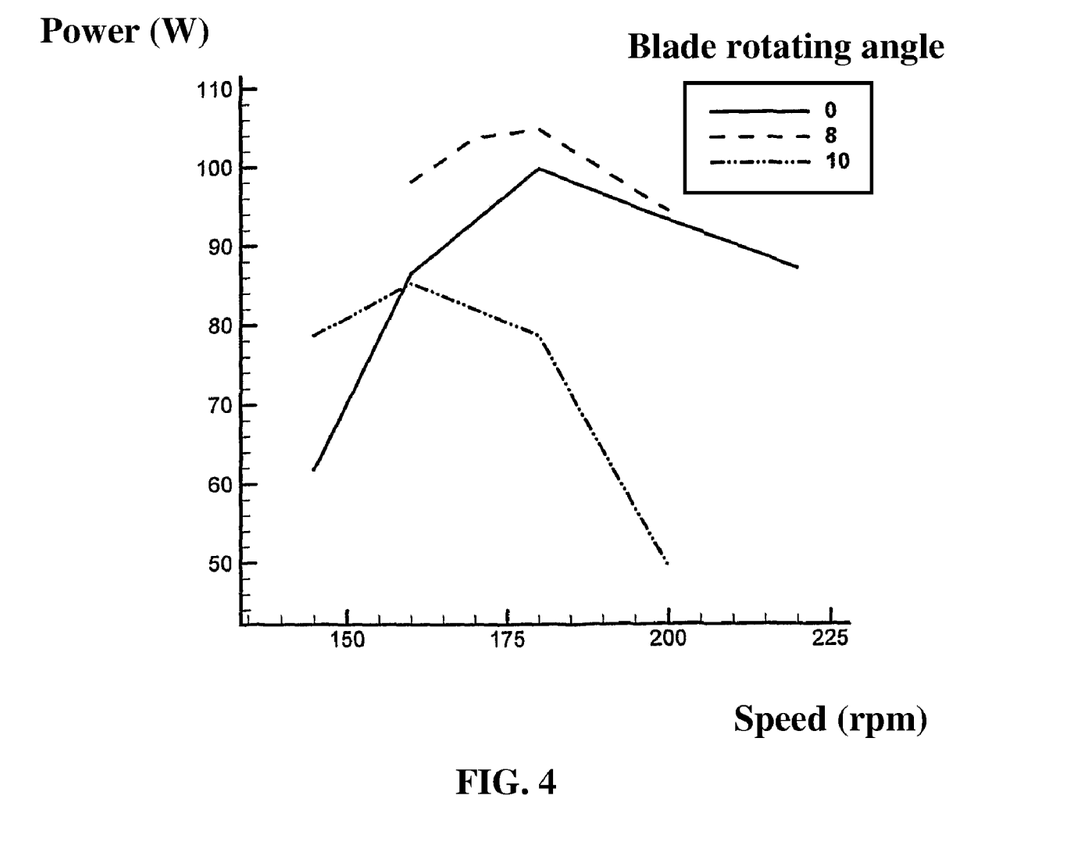
FIGS. 4 and 5 are graphs of power (in W) versus speed (in rpm) for different values of the ratio of the blade rotating angle according to the invention.

With reference to FIG. 4, when the blade rotating angle is between 0 and 10 degrees, the wind rotor can obtain a relatively large power. A better power is obtained when the blade rotating angle is between 2 and 8 degrees. However, a progressively smaller blade rotating angle will affect the start-up of the rotor.

When the wind rotor is static, the blade is resistance-free. A blade can get a large moment of torque to easily start the wind rotor with a large blade rotating angle; while a blade can get a small moment of torque and have difficulty in starting the wind rotor with a small blade rotating angle.

When the wind rotor rotates, as the rotating speed increases, on the one hand, adjusting the blade rotating angle as necessary can make the torque force on the blade increase faster than the resistance, the resultant force increases, and thus the moment acting on the wind rotor increases; on the other hand, adjusting the blade rotating angle can also make the resistance of the blade increase faster than the torque force, and thus the moment acting on the wind rotor decreases.

EXAMPLE 3

Output Power of the Wind Rotor by Computer Simulative Calculation with Different Number of Blades The radius of the wind rotor was 0.68 m. The cumber-airfoil blade Goe63 was mounted such that its convex surface faces vertical axis. The wind speed was 10 m/s. Then, a curve for the rotating speeds and output power of the wind rotor under different blade rotating angles was calculated.

Figure 5:
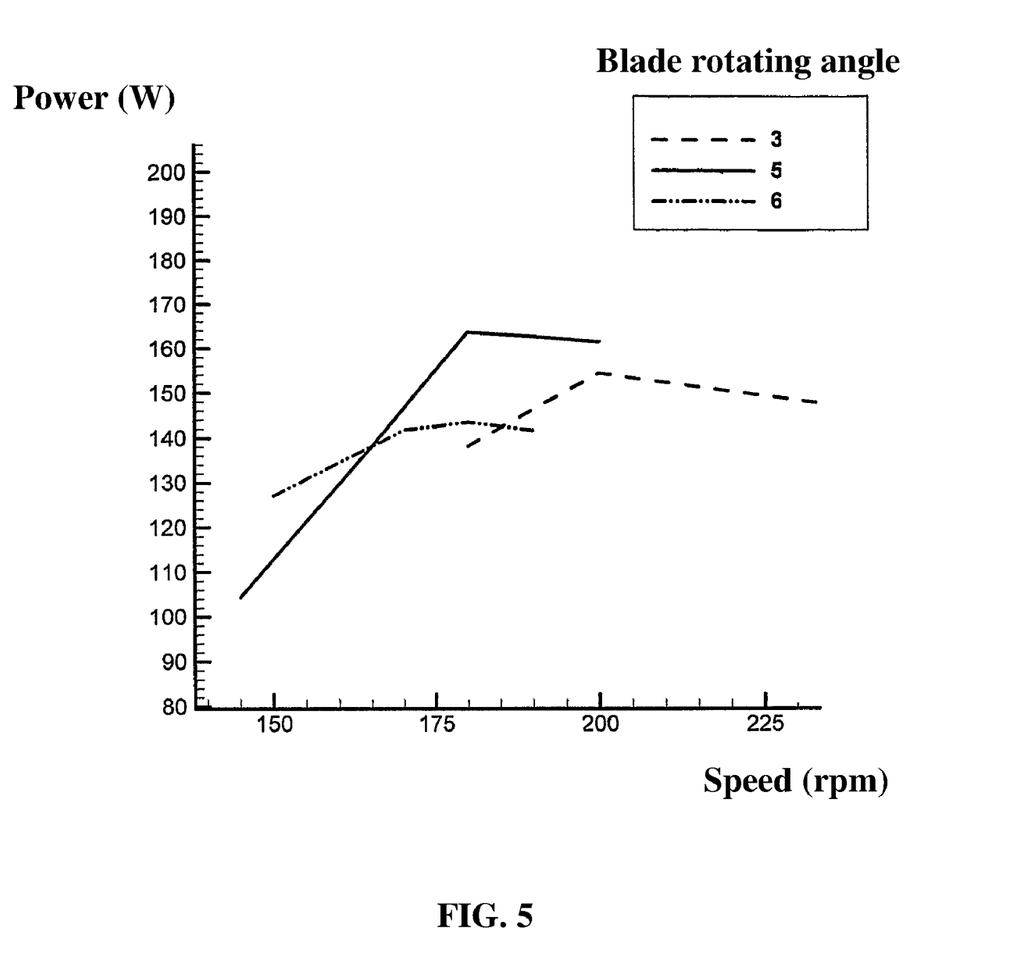

As shown in FIG. 5, by comparing the wind rotor respectively consisting of 3, 5, 6 blades, when the chord length of the blade is constant, as the number of blades increases, the distance between adjacent blades is shortened, then the vortex produced at the rear edge of the previous blade increases the aerodynamic resistance on the next blade, thus the moment of the wind rotor decreases. However, if the number of blades is too small, the moment acting on the wind rotor will decrease accordingly. It was determined experimentally that a wind rotor consisting of 5 blades would produce a maximum output power.

EXAMPLE 4

Effect of Different Numbers of Blades on the Start-Up of the Wind Rotor

The following Tables 1, 2, and 3 show data of the force impact on the wind rotor in a static state measured under the condition that a Goe63 airfoil is adopted, the blade is installed in the manner that its convex surface faces the vertical axis, the blade rotating angle is between 0 and 10 degrees, and the wind speed was 10 m/s.

Table 1 shows data of the force impact on the wind rotor consisting of 6 blades in a static state. Table 2 shows data of the force impact on the wind rotor consisting of 4 blades in a static state. Table 3 shows data of the force impact on the wind rotor consisting of 3 blades in a static state. The larger the moment of torque, the more easily the wind rotor will start. However, in the following tables, the wind rotor cannot be easily started in case of a very small moment of torque on the blades, for example, the azimuth angle with a resulting torque (Nm) of 4 in Table 1, the azimuth angle with a resulting torque (Nm) of 3.5 in Table 2 and the azimuth angle with the resulting torque (Nm) of 0.8 and 1 in Table 3.

TABLE 1

| Azimuth angle | 0 | 10 | 20 | 30 | 40 | 50 |
|---|---|---|---|---|---|---|
| Torque (Nm) | −0.5 | 0 | 4.5 | 8.5 | 3.5 | 2.5 |
| Azimuth angle | 60 | 70 | 80 | 90 | 100 | 110 |
| Torque (Nm) | 4 | 5 | 6 | 7.5 | 5 | 5 |
| Azimuth angle | 120 | 130 | 140 | 150 | 160 | 170 |
| Torque (Nm) | 4.5 | 7 | 5 | 5 | 5 | 3.5 |
| Azimuth angle | 180 | 190 | 200 | 210 | 220 | 230 |
| Torque (Nm) | 2.5 | 2.5 | 0 | 0.5 | 0.5 | 0 |
| Azimuth angle | 240 | 250 | 260 | 270 | 280 | 290 |
| Torque (Nm) | 0 | 0 | −0.25 | −0.3 | −2.2 | −2.8 |
| Azimuth angle | 300 | 310 | 320 | 330 | 340 | 350 |
| Torque (Nm) | −3.2 | −3.8 | −4 | −4.6 | −4.5 | −4.2 |
| Resulting Torque (Nm) | 7.3 | 10.7 | 11.25 | 16.6 | 7.3 | 4 |

TABLE 2

| Azimuth angle | 0 | 10 | 20 | 30 | 40 | 50 | 60 | 70 | 80 |
|---|---|---|---|---|---|---|---|---|---|
| Torque (Nm) | −0.5 | 0 | 4.5 | 8.5 | 3.5 | 2.5 | 4 | 5 | 6 |
| Azimuth angle | 90 | 100 | 110 | 120 | 130 | 140 | 150 | 160 | 170 |
| Torque (Nm) | 7.5 | 5 | 5 | 4.5 | 7 | 5 | 5 | 5 | 3.5 |
| Azimuth angle | 180 | 190 | 200 | 210 | 220 | 230 | 240 | 250 | 260 |
| Torque (Nm) | 2.5 | 2.5 | 0 | 0.5 | 0.5 | 0 | 0 | 0 | −0.25 |

TABLE 2-continued

| Azimuth angle | 270 | 280 | 290 | 300 | 310 | 320 | 330 | 340 | 350 |
|---|---|---|---|---|---|---|---|---|---|
| Torque (Nm) | −0.3 | −2.2 | −2.8 | −3.2 | −3.8 | −4 | −4.6 | −4.5 | −4.2 |
| Resulting Torque (Nm) | 9.2 | 5.3 | 6.7 | 10.3 | 7.2 | 3.5 | 4.4 | 5.5 | 5.05 |

TABLE 3

| Azimuth angle | 0 | 10 | 20 | 30 | 40 | 50 | 60 | 70 | 80 | 90 | 100 | 110 |
|---|---|---|---|---|---|---|---|---|---|---|---|---|
| Torque (Nm) | −0.5 | 0 | 4.5 | 8.5 | 3.5 | 2.5 | 4 | 5 | 6 | 7.5 | 5 | 5 |
| Azimuth angle | 120 | 130 | 140 | 150 | 160 | 170 | 180 | 190 | 200 | 210 | 220 | 230 |
| Torque (Nm) | 4.5 | 7 | 5 | 5 | 5 | 3.5 | 2.5 | 2.5 | 0 | 0.5 | 0.5 | 0 |
| Azimuth angle | 240 | 250 | 260 | 270 | 280 | 290 | 300 | 310 | 320 | 330 | 340 | 350 |
| Torque (Nm) | 0 | 0 | −0.3 | −0.3 | −2.2 | −3 | −3.2 | −3.8 | −4 | −4.6 | −4.5 | −4.2 |
| Resulting Torque (Nm) | 4 | 7 | 9.25 | 13.2 | 6.3 | 3.2 | 3.3 | 3.7 | 2 | 3.4 | 1 | 0.8 |

Through multiple wind tunnel tests, we found that a different number of blades will affect the starting performance at a low wind speed of the wind rotor for a vertical axis wind turbine. The smaller the number of blades, the more dead positions the wind rotor will encounter when starting, and thus the more difficultly the wind rotor will start. Therefore, an increase of the number of blades will apparently improve the starting performance of vertical axis wind turbine. But as the number of blades increases, the torque for the wind rotor at high rotating speeds will decrease, which also affects the wind energy utilization ratio of the wind rotor.

Taking the starting performance and wind energy utilization ratio into account, five blades provides an optimal effect.

EXAMPLE 5

Contrast Wind Tunnel Tests under Different Number of Blades

Figure 6:
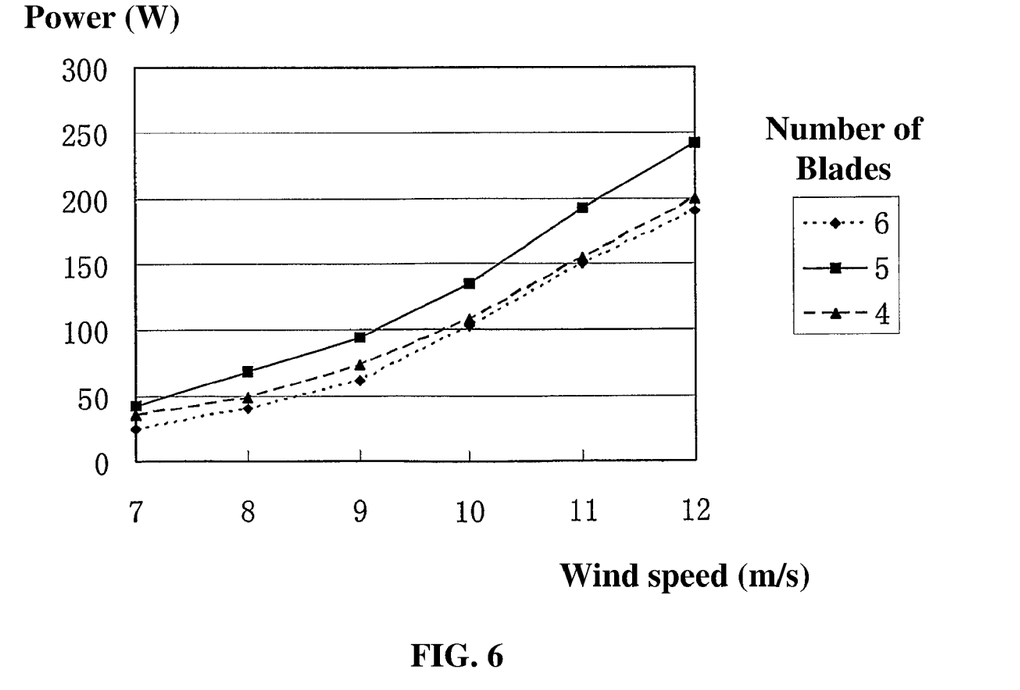
FIG. 6 is a graph of power (in W) versus wind speed (in m/s) for different number of blades according to the invention.

FIG. 6 shows a curve diagram of the output power obtained when the number of blades is 4, 5 and 6 under the condition that the rotation radius of the wind rotor was 0.68 m, a Goe63 airfoil was adopted and installed in the manner that its convex surface faced the vertical axis, the radius/chord ratio was 3 and the blade rotating angle was between 0 and 10 degrees.

With reference to FIGS. 5 and 6, a wind rotor comprising 5 blades can offer a high wind energy utilization ratio for the vertical axis wind turbine in this invention and in particular, lessen the number of dead positions for starting the wind rotor and make the wind rotor easy to start at a low wind speeds.

EXAMPLE 6

Connecting the Blade and the Support Arm with Blade Ferrule

Figure 7:
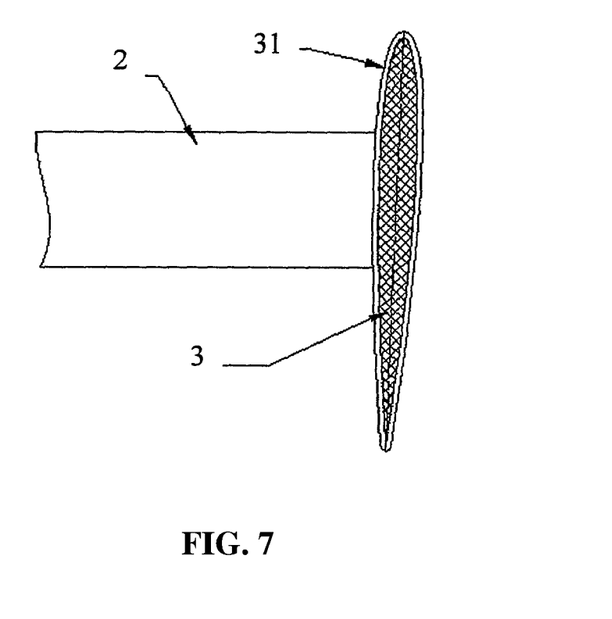
FIG. 7 illustrates the connection of blades to support arms through blade ferrules.

FIG. 7 shows the profile of the connection of the blade and the support arm, wherein there is a metal ring 31 having a proper width and thickness in the end of the support arm connected to the blade; the blade is inside this metal ring. The metal ring is called blade ferrule, which has a specific mechanical strength and plays a role of fixing the blades and enhancing the safety for the wind rotor during rotation by connecting with the support arm.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

The invention claimed is:

1. A method for installing a vertical axis wind turbine having support limbs, each support limb having a first end and a second end and defining a circumference and rotation radius of a wind rotor, a vertical shaft, and a plurality of blades, each blade being an asymmetrical cambered airfoil having a convex upper surface, a lower surface, and a chord line, the method comprising:
   connecting the first end of said support limbs with said vertical shaft
   selecting the blades so that a ratio of the rotation radius of the wind rotor to a length of the chord line of the cambered airfoil of the blades is in a range of about 1.8 to 4,
   installing each of said plurality of blades at the second end of the corresponding support limbs in an aligned horizontal level,
   facing the convex upper surface of the cambered airfoil of each blade to said vertical shaft, and
   positioning and fixing each blade so that an angle between the chord line of the cambered airfoil of the blade and a tangent line to the circumference of the corresponding support limb is within 0 to 10 degrees.

2. The method of claim 1, wherein each blade is positioned and fixed at the angle of between 2 to 8 degrees.

3. The method of claim 1, wherein said plurality of blades comprises 3-6 blades.

4. The method of claim 3, wherein said plurality of blades comprises 5 blades.

5. The method of claim 1, wherein the blades are selected so that the ratio of the rotation radius of the wind rotor to the length of the chord line of the airfoil of the blades is in a range of about 2 to 3.

6. The method of claim 1, further comprising
   fixing each of the blades inside a blade ferrule, and
   connecting the blade ferrule to the second end of the support arms.

7. The method of claim 1, wherein the vertical shaft is hollow and the wind rotor passes through the vertical shaft and is connected to a base.

* * * * *